United States Patent Office 2,717,883
Patented Sept. 13, 1955

2,717,883

SOLUTIONS OF A COPOLYMER OF ACRYLONITRILE AND AN N-SUBSTITUTED ACRYLAMIDE

Alfred L. Miller, Roselle, N. J., assignor to Celanese Corporation of America, New York, N. Y., a corporation of Delaware No Drawing. Application June 5, 1952,
Serial No. 291,976

18 Claims. (Cl. 260—32.4)

This invention relates to polymers and relates more particularly to solutions of copolymers of acrylonitrile and a vinamide.

One of the difficulties that has hitherto limited the more widespread use of polymers and copolymers of acrylonitrile is the insolubility of said materials in common, inexpensive solvents. The solvents and solvent mixtures that have been suggested previously for forming solutions of said polymers and copolymers are either expensive, or the necessity for using them in mixtures increases the costs of handling and recovering the same.

It is an important object of this invention to provide a solution of a copolymer of acrylonitrile which will be free from the foregoing and other difficulties.

Another object of this invention is to provide a solution of a copolymer of acrylonitrile and a vinamide in common, inexpensive solvents.

Other objects of this invention will be apparent from the following detailed description and claims.

According to the present invention, a copolymer of acrylonitrile and a vinamide is dissolved to form a solution in nitromethane, cyclopentanone, cyclohexanone or acetone. The said solutions may be employed for the production of filamentary materials, for example, by dry spinning or wet spinning process. They may also be employed for the production of films or as coating compositions. There may be incorporated into said solutions dyes, pigments, nacreous materials, plasticizers, ultraviolet light absorbents, fire retardents and the like to modify the properties of the products prepared from said solutions.

The copolymers which may be employed for forming the solutions of the present invention are prepared by copolymerizing acrylonitrile with a vinamide. Examples of suitable vinamides, or α,β-unsaturated acid amides, are N-methyl acrylamide, N-ethyl acrylamide, N-propyl acrylamide, N-butyl acrylamide, N-octyl acrylamide and the like, N-phenyl acrylamide and the corresponding methacrylamides. A particularly valuable class of vinamides that may be copolymerized with acrylonitrile are those in which the nitrogen atom carries a substituent linked thereto by a tertiary carbon atom or by a secondary carbon atom forming part of a cycloalkyl group as disclosed in application S. No. 164,855, filed May 27, 1950. Examples of vinamides falling within this class are N-tertiary butyl acrylamide, N-tertiary amyl acrylamide, N-(dimethyl-phenyl-carbinyl)-acrylamide, N-cyclohexyl acrylamide, N-cyclopentyl acrylamide and the corresponding methacrylamides, N-tertiary butyl crotonamide, N - tertiary butyl cinnamamide, N - tertiary amyl crotonamide, N-tertiary amyl cinnamamide, N-tertiary amyl cinnamamide, N-cyclohexyl crotonamide, N-cyclopentyl crotonamide, N-cyclohexyl cinnamamide and N-cyclopentyl cinnamamide.

The percentage of acrylonitrile in the copolymer will vary depending upon the solvent in which it is desired to dissolve the copolymer and the properties it is desired to obtain in the final product. Copolymers soluble in nitromethane may contain up to about 97 mole percent of acrylonitrile or preferably between about 60 and 97 mole percent of acrylonitrile. Copolymers soluble in cyclohexanone and cyclopentanone may contain up to about 87 mole percent of acrylonitrile or preferably between about 5 and 87 mole percent of acrylonitrile. Copolymers soluble in acetone may contain up to about 67 mole percent of acrylonitrile or preferably between about 5 and 67 mole percent of acrylonitrile.

The copolymerization reaction may be carried out in any suitable manner as, for example, in bulk, in solution, in emulsion or in suspension. Thus, the monomers may be suspended in about 8 to 10 parts by weight of water containing a surface active agent. A polymerization catalyst is added to the suspension and the resulting mixture is agitated, preferably in an inert atmosphere, until the polymerization is complete. In carrying out the copolymerization in this manner, the temperature is advantageously maintained between about 30 and 60° C. at which temperature the copolymerization is usually complete in form about 3 to 20 hours.

The copolymerization is preferably carried out in an aqueous medium containing a sufficient amount of water-miscible organic solvent to dissolve all of the monomers as disclosed in application S. No. 291,975, filed on even date herewith. The quantity of organic solvent is kept at a minimum to reduce any tendency for the organic solvent to interrupt the growth of the copolymer chains. In this way, there may be obtained copolymers of high molecular weight as evidenced by their high intrinsic viscosity.

The solutions of the present invention may be prepared by mixing the copolymers and solvents in any suitable apparatus, preferably an apparatus equipped with means for agitating the mixture. The solvent-copolymer mixture may be heated to elevated temperatures to assist in obtaining a rapid solution of the copolymers. Another method according to which the solutions may be prepared is to cool the copolymer and solvent before mixing, mix the two and allow the temperature to rise slowly until a complete solution is obtained.

The following examples are given to illustrate this invention further.

*Example I*

A copolymer of N-cyclohexyl acrylamide and acrylonitrile, containing 76 mole percent of acrylonitrile as determined by nitrogen analysis, is mixed at room temperature with sufficient cyclohexanone to form a 20% by weight solution. There is obtained a clear solution which may be employed, for example, for the spinning of filaments or the casting of films.

*Example II*

A copolymer of N-cyclohexyl acrylamide and acrylonitrile, containing 81 mole percent of acrylonitrile as determined by nitrogen analysis, is mixed with sufficient cyclopentanone at room temperature to form a 20% by weight solution. There is obtained a clear solution which may be employed, for example, for the spinning of filaments or the casting of films.

*Example III*

A copolymer of N-cyclohexyl acrylamide and acrylonitrile, containing 51 mole percent of acrylonitrile as determined by nitrogen analysis, is mixed with sufficient acetone at room temperature to form a 20% by weight soltuion. There is obtained a clear solution which may be employed, for example, for the spinning of filaments or the casting of films.

*Example IV*

A copolymer of N-cyclohexyl acrylamide and acrylonitrile, containing 91 mole percent of acrylonitrile as determined by nitrogen analysis, is mixed with sufficient nitromethane at room temperature to form a 20% by weight solution. There is obtained a clear solution which may be employed, for example, for the spinning of filaments or the casting of films.

It is to be understood that the foregoing detailed description is given merely by way of illustration and that many variations may be made therein without departing from the spirit of my invention.

Having described my invention, what I desire to secure by Letters Patent is:

1. A solution of a copolymer of acrylonitrile and an N-substituted acrylamide, in which the N-substituent is a hydrocarbon group in a solvent consisting essentially of a single member of the group consisting of cyclopentanone, cyclohexanone, acetone and nitromethane.

2. A solution of a copolymer of acrylonitrile and N-cyclohexyl acrylamide in a solvent consisting essentially of a single member of the group consisting of cyclopentanone, cyclohexanone, acetone and nitromethane.

3. A solution of a copolymer of acrylonitrile and an N-substituted acrylamide, in which the N-substituent is a hydrocarbon group containing up to about 87 mole percent of acrylonitrile, in a solvent consisting essentially of cyclopentanone.

4. A solution of a copolymer of acrylonitrile and an N-substituted acrylamide, in which the N-substituent is a hydrocarbon group containing up to about 87 mole percent of acrylonitrile, in a solvent consisting essentially of cyclohexanone.

5. A solution of a copolymer of acrylonitrile and an N-substituted acrylamide, in which the N-substituent is a hydrocarbon group containing up to about 67 mole percent of acrylonitrile, in a solvent consisting essentially of acetone.

6. A solution of a copolymer of acrylonitrile and an N-substituted acrylamide, in which the N-substituent is a hydrocarbon group containing up to about 97 mole percent of acrylonitrile, in a solvent consisting essentially of nitromethane.

7. A solution of copolymer of acrylonitrile and an N-substituted acrylamide, in which the N-substituent is a hydrocarbon group containing between about 5 and 87 mole percent of acrylonitrile, in a solvent consisting essentially of cyclopentanone.

8. A solution of copolymer of acrylonitrile, and an N-substituted acrylamide, in which the N-substituent is a hydrocarbon group containing between about 5 and 87 mole percent of acrylonitrile, in a solvent consisting essentially of cyclohexanone.

9. A solution of a copolymer of acrylonitrile and an N-substituted acrylamide, in which the N-substituent is a hydrocarbon group containing between about 5 and 67 mole percent of acrylonitrile, in a solvent consisting essentially of acetone.

10. A solution of a copolymer of acrylonitrile and an N-substituted acrylamide, in which the N-substituent is a hydrocarbon group containing between about 5 and 97 mole percent of acrylonitrile, in a solvent consisting essentially of nitromethane.

11. A solution of a copolymer of acrylonitrile and N-cyclohexyl acrylamide, containing up to about 87 mole percent of acrylonitrile, in a solvent consisting essentially of cyclopentanone.

12. A solution of a copolymer of acrylonitrile and N-cyclohexyl acrylamide, containing up to about 87 mole percent of acrylonitrile, in a solvent consisting essentially of cyclohexanone.

13. A solution of a copolymer of acrylonitrile and N-cyclohexyl acrylamide, containing up to about 67 mole percent of acrylonitrile, in a solvent consisting essentially of acetone.

14. A solution of a copolymer of acrylonitrile and N-cyclohexyl acrylamide, containing up to about 97 mole percent of acrylonitrile, in a solvent consisting essentially of nitromethane.

15. A solution of a copolymer of acrylonitrile and N-cyclohexyl acrylamide, containing between about 5 and 87 mole percent of acrylonitrile, in a solvent consisting essentially of cyclopentanone.

16. A solution of a copolymer of acrylonitrile and N-cyclohexyl acrylamide, containing between about 5 and 87 mole percent of acrylonitrile, in a solvent consisting essentially of cyclohexanone.

17. A solution of a copolymer of acrylonitrile and N-cyclohexyl acrylamide, containing between about 5 and 67 mole percent of acrylonitrile, in a solvent consisting essentially of acetone.

18. A solution of a copolymer of acrylonitrile and N-cyclohexyl acrylamide, containing between about 5 and 97 mole percent of acrylonitrile, in a solvent consisting essentially of nitromethane.

References Cited in the file of this patent

UNITED STATES PATENTS

| | | |
|---|---|---|
| 2,592,248 | Coover et al. | Apr. 8, 1952 |
| 2,601,252 | Bruson | June 24, 1952 |